United States Patent [19]

Knobloch

[11] Patent Number: 5,116,894
[45] Date of Patent: May 26, 1992

[54] STABILIZER MIXTURES FOR ELASTOMERS

[75] Inventor: Gerrit Knobloch, Magden, Switzerland

[73] Assignee: Ciba-Geigy Corporation, Ardsley, N.Y.

[21] Appl. No.: 701,265

[22] Filed: May 16, 1991

[30] Foreign Application Priority Data

May 22, 1990 [CH] Switzerland .......................... 1731/90

[51] Int. Cl.$^5$ ................................................ C08K 5/34
[52] U.S. Cl. ....................................... 524/100; 524/330
[58] Field of Search ............................... 524/100, 330

[56] References Cited

U.S. PATENT DOCUMENTS

| | | | |
|---|---|---|---|
| 3,240,749 | 3/1966 | Dexter et al. | 524/102 |
| 3,245,992 | 4/1966 | Dexter et al. | 529/100 |
| 3,250,772 | 5/1966 | Dexter et al. | 524/100 |
| 3,255,191 | 6/1966 | Dexter et al. | 524/100 |
| 3,557,050 | 1/1971 | Koizumi et al. | 260/45.8 |
| 3,557,051 | 1/1971 | Kometani et al. | 260/45.8 |
| 3,594,448 | 7/1971 | Birenzvige et al. | 524/100 |
| 3,660,352 | 5/1972 | Song | 524/330 |
| 4,759,862 | 7/1988 | Meier | 252/47.5 |
| 4,857,572 | 8/1989 | Meier et al. | 524/289 |
| 5,008,459 | 4/1991 | Meier et al. | 568/46 |

FOREIGN PATENT DOCUMENTS 1184533 3/1970 United Kingdom .

*Primary Examiner*—Kriellion S. Morgan
*Attorney, Agent, or Firm*—Luther A. R. Hall

[57] ABSTRACT

A composition comprising an elastomer and a stabilizer mixture consisting of
a) at least one phenol of formula

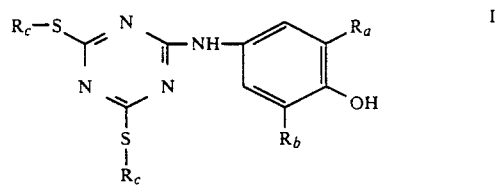

wherein $R_a$ and $R_b$ are each independently of the other $C_1$–$C_4$alkyl and $R_c$ is $C_6$–$C_{12}$alkyl, and
b) at least one phenol of formula II

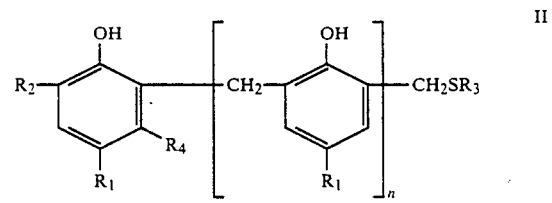

wherein n is 0 to 3, $R_1$ and $R_2$ are each independently of the other $C_1$–$C_{12}$alkyl or —$CH_2SR_3$, $R_3$ is $C_3$–$C_{18}$alkyl, phenyl or benzyl, and $R_4$ is hydrogen or methyl.

16 Claims, No Drawings

STABILIZER MIXTURES FOR ELASTOMERS

The present invention relates to compositions comprising an elastomer and a stabiliser mixture consisting of a 2,4-bis(alkylmercapto)-6-(3,5-dialkyl-4-hydroxyanilino)-s-triazine and an alkylthiomethylphenol.

Phenols which contain alkylthiomethyl groups are known stabilisers. Thus, for example, the use of 2,4,6-trialkyl-bis(3,5l-alkylthiomethyl)phenols as antioxidants in polymers and elastomers is disclosed in U.S. Pat. No. 3,660,352. Further, GB-A 1 184 533 teaches the use of 2,4-bis(alkylthiomethyl)-3,6-dialkylphenols as stabilisers for organic polymers as well as for synthetic oils. Similar compounds are disclosed in EP-A 165 209.

In addition, EP-A 224 442 teaches the use of 2,4-bis-(alkylthiomethyl)-6-alkylphenols as stabilisers for elastomers. This publication also cites the possibility of using these stabilisers in conjunction with further phenolic antioxidants as co-stabilisers.

There is still, however, a need to provide effective stabilisers for elastomers which are sensitive to oxidative degradation.

Surprisingly, it has now been found that a combination of two sulfur-containing phenols has a very good stabilising action in elastomers.

Accordingly, the present invention relates to a composition comprising an elastomer and a stabiliser mixture consisting of
a) at least one phenol of formula

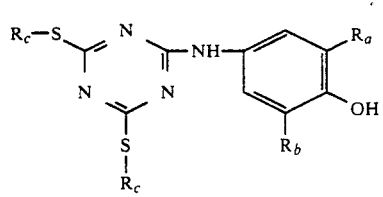

I wherein $R_a$ and $R_b$ are each independently of the other $C_1$–$C_4$alkyl and $R_c$ is $C_6$–$C_{12}$alkyl, and
b) at least one phenol of formula II

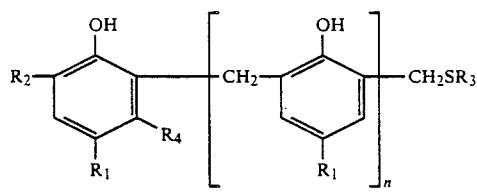

II wherein n is 0 to 3, $R_1$ and $R_2$ are each independently of the other $C_1$–$C_{12}$alkyl or —$CH_2SR_3$, $R_3$ is $C_8$–$C_{18}$alkyl, phenyl or benzyl, and $R_4$ is hydrogen or methyl.

$R_1$ and $R_2$ is $C_1$–$C_{12}$alkyl and $R_3$ as $C_1$–$C_{18}$alkyl are typically methyl, ethyl, n-propyl, isopropyl, n-butyl, sec-butyl, isobutyl, tert-butyl, n-pentyl, isopentyl, n-hexyl, 1,1-dimethylbutyl, n-heptyl, n-octyl, 2-ethylhexyl, 1,1,3,3-tetramethylbutyl, n-nonyl, n-decyl, 1,1,3,3-tetramethylhexyl, n-undecyl, n-dodecyl, 1,1,3,3,5,5-hexamethylhexyl, 1,1,4,6,6-pentamethylhept-4-yl, and $R_3$ as $C_1$–$C_{18}$alkyl is additionally n-tridecyl, n-tetradecyl, n-hexadexyl or n-octadecyl.

$R_3$ is preferably $C_8$–$C_{12}$alkyl.

The meanings of $R_a$ and $R_b$ as $C_1$–$C_4$alkyl and of $R_c$ as $C_6$–$C_{12}$alkyl have generally the meanings of $R_1$–$R_3$ consistent with the corresponding number of carbon atoms.

Preferred stabilisers b) are phenols of formula II, wherein $R_4$ is hydrogen. Phenols of formula II, wherein n is 0, are also preferred.

In formula II one of the substituents $R_1$ or $R_2$ is preferably —$CH_2SR_3$.

The phenols of formula II are especially preferred wherein $R_1$ is a —$CH_2SR_3$ radical.

$R_3$ is preferably $C_8$–$C_{12}$alkyl, more particularly n-octyl or n-dodecyl.

Also especially preferred are the phenols of formula II, wherein $R_2$ is a —$CH_2SR_3$ radical in which $R_3$ is preferably n-dodecyl.

Interesting phenols of formula II are also those in which $R_2$ is methyl or tert-butyl, preferably methyl.

The phenol of formula II, wherein n is 0 and $R_1$ is —$CH_2SR_3$, $R_2$ is methyl, $R_3$ is n-octyl and $R_4$ is hydrogen, is most particularly preferred.

Also very particularly preferred is the phenol of formula II, wherein n is 0 and $R_1$ is branched nonyl, $R_2$ is —$CH_2SR_3$, $R_3$ is n-dodecyl and $R_4$ is hydrogen.

Typical representatives of phenols of formula II are the following:
2,4-bis(n-octylthiomethyl)-6-methylphenol,
2,4l-bis(n-octylthiomethyl)-3,6-dimethylphenol,
2,4-bis(2'-ethylhexylthiomethyl)-6-tert-butyl-2-methylphenol,
2-(n-octylthiomethyl)-4-tert-butyl-6-methylphenol,
2,6-bis(n-dodecylthiomethyl)-4-tert-nonylphenol,
methylene-bis-o,o'-[3,3'-bis(n-dodecylthiomethyl)-5,5'-di-tert-nonyl]phenol,
methylene-bis-oo'-[3-methyl-5-(n-octylthiomethyl)-3',5'-bis(n-octylthiomethyl)]phenol.

In the compounds of formula I, $R_a$ and $R_b$ are preferably identical. Most preferably they are tert-butyl. $R_c$ is preferably octyl, most preferably n-octyl.

The compositions of this invention may typically contain the following materials as elastomers:

1. Polydienes such as polybutadiene, polyisoprene or polychloroprene; block polymers such as styrene/butadiene/styrene, styrene/isoprene/styrene, acrylonitrile/butadiene copolymers or styrene/butadiene copolymers.

2. Copolymers of mono- and diolefins with one another or with other vinyl monomers, for example ethylene/alkylacrylate copolymers, ethylene/alkylmethacrylate copolymers, ethylene/vinyl acetate copolymers as well as terpolymers of ethylene with propylene and a diene, such as hexadiene, dicyclopentadiene or ethylidene norbornene.

3. Halogenated polymers, for example polychloroprene, chlorinated or brominated copolymes of isobutylene and isoprene (=halogenated butyl rubber), chlorinated rubber, chlorinated or chlorosulfonated polyethylene, epichlorohydrin homo- and copolymers, chlorotrifluoroethylene copolymers, polymers of halogenated vinyl compounds such as polyvinylidene chloride, polyvinylidene fluoride; and also their copolymers, such as vinyl chloride/vinylidene chloride, vinyl chloride/vinyl acetate or vinylidene chloride/vinyl acetate.

4. Polyurethanes which are derived from polyethers, polyesters and polybutadiene containing hydroxyl end groups on the one hand, and aliphatic or aromatic polyisocyanates on the other, and their precursors.

5. Natural rubber.

6. Mixtures (polyblends) of the aforementioned polymers.

7. Aqueous emulsions of natural or synthetic rubbers, for example natural latex or latices of carboxylated styrene/butadiene copolymers.

These elastomers may also be in the form of latices and can be stabilised in this form.

Preferred compositions are those which contain a polydiene, such as polybutadiene rubber, as elastomer. Most preferably the polydiene is an acrylonitrile/-butadiene copolymer.

The compositions of this invention conveniently contain 0.01–10% by weight, preferably 0.05–5.0% by weight of the stabiliser mixture of a) and b), based on the elastomer.

The ratio of the stabiliser components a) and b) to each other may vary over a wide range and is in principle not critical. Normally the ratio of a) to b) is 10:1 to 1:10, preferably 5:1 to 1:5, more particularly 2:1 to 1:2 and, most preferably 1:1 parts by weight.

Incorporation in the elastomers is normally effected by adding solutions of the phenols in organic solvents, or emulsions or dispersions, to the corresponding rubber solutions and latices after the termination of polymerisation and before the coagulation of the rubbers.

However, incorporation in the elastomers can also be effected, for example, by adding the phenols of formulae I and II and further optional additives such as vulcanisation accelerators, fillers, plasticisers or pigments, by methods commonly employed in the art, before or after shaping. The phenols of formulae I and II can also be added in the form of a masterbatch which contains these compounds, typically in a concentration of 2.5 to 25% by weight, to the plastics materials to be stabilised.

Hence the invention also relates to a process for stabilising elastomers, which comprises incorporating therein or applying thereto a combination of phenols of formulae I and II.

The phenols of formula II are prepared by methods which are known per se, for example as described in EP-A 165 209 and in U.S. Pat. No. 3,227,677 and U.S. Pat. No. 4,707,300. They can, however, also be prepared by reacting a phenol of formula IIa

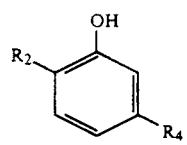

wherein $R_2$ and $R_4$ are as previously defined, with formaldehyde or a formaldehyde donor under the reaction conditions and with at least one mercaptan $R_3$-SH, in the presence of a base, said base being selected from the group consisting of mono-, di- and trimethylamine and mono- and diethylamine.

All starting materials are known and can be prepared by known methods. Some are also commercially available.

The phenols of formula I are also prepared by methods which are known per se, for example as described in U.S. Pat. No. 3,240,749, Example 1.

The invention is illustrated by the following Examples in which, unless otherwise stated, parts and percentages are by weight.

EXAMPLE 1

Preparation of 2,4l-bis(n-octylthiomethyl)-6-methylphenol

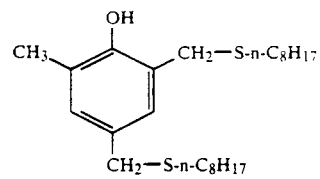

160.74 g (0.72 mol) of 2,4-bis(dimethylaminomethyl)-6l-methylphenol and 210.65 g (1.44 mol) of n-octanethiol are heated in an apparatus equipped with stirrer ad multiple coil condenser for 36 hours to 150° C., while continuously removing dimethylamine at 53.2 bar, to give 291.6 g (95%) of a yellow oil. Column chromatography of the crude produce over silica gel gives pure 2,4l-bis(n-octylthiomethyl)-6-methylphenol as a colourless oil.

Analytical data:
Calculated: 70.69% C, 10.44% H, 15.09% S.
Found: 70.85% C, 10.42% H, 15.11% S.

EXAMPLE 2

Preparation of 2,4-bis(n-octylthiomethyl)-6-tert-butylphenol

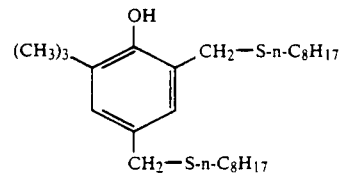

A mixture of 22.5 g of 6l-tert-butylphenol, 18.0 g of paraformaldehyde, 43.9 g of n-octanethiol, 4.0 g of 33% ethanolic dimethylamine and 23 ml of N,N-dimethylformamide is heated under nitrogen for 3 hours in a sulfonating flask equipped with reflux condenser and mechanical stirrer. The temperature in the reactor is 110° C. The crude produce is taken up in 150 ml of ethyl acetate and washed with 100 ml of water.

Evaporation of the organic phase to dryness gives 51 g (97% of theory) of 2,4l-bis(n-octylthiomethyl)-6l-tert-butylphenol as a colourless oil.

Analytical data:
Calculated: 13.74% S.
Found: 13.44% S.

EXAMPLE 3

A non-stabilised nitrile rubber as latex (copolymer of acrylonitrile and butadiene) having a solids content of 26% is preheated to 50° C. then a stabiliser mixture of 0.15% of the phenol of formula I, wherein $R_a=R_b=$-tert-butyl and $R_c=$n-octyl (1) and 0.15% of 2,4-bis(n-octylthiomethyl)-6-methylphenol (21), in each case based on solids, are stirred into the latex in the form of an emulsion or dispersion. With efficient stirring, the latex is then slowly added (ca. 50 ml/min) from a dropping funnel to the coagulation serum which has been heated to 60° C. One liter of serum consisting of 6 g of $MgSO_4$.7 $H_2O$ in 1 liter of demineralised water is used per 100 g of solid rubber (=381 g of latex). The coagulated rubber is skimmed off, washed for 2×10 minutes in demineralised water at 60° C., predried on a rubber roll and dried overnight in a vacuum drier at 50° C. The resultant nitrile rubber has an acrylonitrile content of 33% and a Mooney viscosity ML 1+4 (100) of 40-45.

The Mooney viscosity ML 1+4 (100) of the stabilised rubber is determined according to ASTM D 1646 by oven ageing at 100° C.

The results are given in Table 1.

TABLE 1

| Stabiliser mixture | Conc. [%] | Mooney viscosity after days | | | |
|---|---|---|---|---|---|
| | | 0 | 7 | 11 | 14 |
| none | | 40 | 94 | 110 | |
| (1) | 0.15 | 42 | 46 | 54 | 59 |
| (2) | 0.15 | | | | |

EXAMPLE 4

In accordance with the general procedure described in Example 3, a nitrile rubber having an acrylonitrile content of 33% and a Mooney viscosity ML 1+4 (100) of 65-70, as latex having a solids content of 26%, is stabilized with a stabiliser mixture consisting of 0.15% of the phenol (1) and 0.15% of the phenol (2), coagulated and dried.

The Mooney viscosity ML 1+4 (100l) and the induction time during Brabender ageing are determined.

For Brabender ageing, the stabilised rubber is kneaded for 30 minutes in a Brabender plastograph at 180° C. and 60 rpm. The induction time is determined from the gradient of the torque characteristic, i.e. the kneading time in minutes until the increase in torque by 1 Nm after the minimum torque. The results are reported in Table 2.

TABLE 2

| Stabiliser mixture | Conc. [%] | Mooney viscosity after oven ageing, at 100° C. (days) | | | | Brabender ageing at 180° C./60 rpm/ 30 min. induction time [min.] |
|---|---|---|---|---|---|---|
| | | 0 | 2 | 4 | 7 | |
| none | | 68 | 98 | 108 | 130 | 5.0 |
| (1) | 0.15 | 64 | 66 | 66 | 65 | 14.0 |
| (2) | 0.15 | | | | | |

EXAMPLE 5

To a solution of a polybutadiene rubber of the neodymium type are added the dissolved stabilisers (1) [=phenol of formula I, wherein $R_a=R_b=$tert-butyl and $R_c=$n-octyl] and/or (2) [=2,4l-bis(n-octylthiomethyl)-6-methylphenol] (q.v. Tables 3-6), and the rubber solution is then coagulated and dried.

The ageing tests are carried out as described in Example 4 under the conditions indicated in Tables 3-6. In the Brabender test (at 160° C.), the gel content is additionally determined after the ageing test, i.e. the insoluble rubber content in toluene at room temperature.

To determine the Yellowness Index according to ASTM D 1925-70 (YI), the rubber is pressed to 2 mm sheets after coagulation and drying, the YI of these sheets is determined by oven ageing at 70° C. The smaller the values of this index, the less the yellowing. The results are summarised in Tables 3-6.

TABLE 3

| Stabiliser or stabiliser mixture | Conc. [%] | Mooney viscosity after oven ageing at 70° C. (weeks) | | | |
|---|---|---|---|---|---|
| | | 0 | 4 | 6 | 8 |
| none | | 42 | * | | |
| (1) | 0.125 | 42 | 43 | 42 | 42 |
| (2) | 0.125 | | | | |

*the rubber is destroyed

TABLE 4

| Stabiliser or stabiliser mixture | Conc. [%] | YI of 2 mm sheets after oven ageing at 70° C. (weeks) | | | | |
|---|---|---|---|---|---|---|
| | | 0 | 1 | 2 | 5 | 10 |
| none | | 8 | 34 | 49 | 57 | 65 |
| (2) | 0.25 | 9 | 20 | 24 | 38 | 43 |
| (1) | 0.125 | 6 | 16 | 17 | 27 | 30 |
| (2) | 0.125 | | | | | |
| (1) | 0.25 | 5 | 16 | 22 | 38 | 46 |

TABLE 5

| Stabiliser or stabiliser mixture | Conc. [%] | Mooney viscosity after oven ageing at 100° C. (days) | | | | | |
|---|---|---|---|---|---|---|---|
| | | 0 | 3 | 6 | 10 | 13 | 16 |
| none | | 42 | 84 | * | | | |
| (2) | 0.25 | 42 | 37 | 36 | 38 | 56 | 89 |
| (1) | 0.125 | 42 | 38 | 36 | 32 | 30 | 29 |
| (2) | 0.125 | | | | | | |
| (1) | 0.25 | 42 | 42 | 44 | 40 | 40 | 54 |

*the rubber is destroyed

TABLE 6

| Stabiliser or stabiliser mixture | Conc. [%] | Brabender ageing at 160° C./60 rpm/30 min | |
|---|---|---|---|
| | | Induction time [min] | gel content [%] |
| none | | 2.3 | 75.4 |
| (2) | 0.25 | 7.0 | 28.8 |
| (1) | 0.125 | 11.0 | 22.2 |
| (2) | 0.125 | | |
| (1) | 0.25 | 11.0 | 33.3 |

What is claimed is:

1. A composition comprising an elastomer and a stabiliser mixture consisting of a) at least one phenol of formula

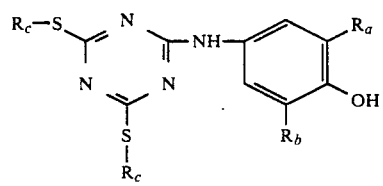

I wherein $R_a$ and $R_b$ are each independently of the other $C_1$-$C_4$alkyl and $R_c$ is $C_6$-$C_{12}$alkyl, and b) at least one phenol of formula II

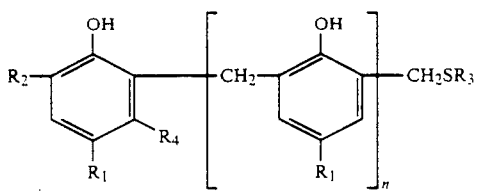

wherein n is 0 to 3, $R_1$ and $R_2$ are each independently of the other $C_1$-$C_{12}$alkyl or —$CH_2SR_3$, $R_3$ is $C_8$-$C_{18}$alkyl, phenyl or benzyl, and $R_4$ is hydrogen or methyl.

2. The composition of claim 1, wherein $R_4$ in the phenol of formula II is hydrogen.

3. The composition of claim 1, wherein n in the phenol of formula II is 0.

4. The composition of claim 1, wherein $R_1$ in the phenol of formula II is a —$CH_2SR_3$ radical.

5. The composition of claim 1, wherein $R_2$ is the phenol of formula II is a —$CH_2SR_3$ radical.

6. The composition of claim 1, wherein the radicals $R_3$ re $C_8$-$C_{12}$alkyl.

7. The composition of claim 1, wherein $R_2$ in the phenol of formula II is methyl or tert-butyl.

8. The composition of claim 1, wherein n in the phenol of formula II is 0 and $R_1$ is —$CH_2SR_3$, $R_2$ is methyl, $R_3$ is n-octyl and $R_4$ is hydrogen.

9. The composition of claim 1, wherein n in the phenol of formula II is 0 and $R_2$ is —$CH_2SR_3$, $R_3$ is n-dodecyl and $R_4$ is hydrogen.

10. The composition of claim 1, wherein $R_a$ and $R_b$ are identical and are tert-butyl, and $R_c$ is octyl.

11. The composition of claim 1, wherein the ratio of a) to b) is 1:10 to 10:1 parts by weight.

12. The composition of claim 1, wherein the elastomer is a polydiene.

13. The composition of claim 12, wherein the polydiene is an acrylonitrile/butadiene copolymer.

14. The composition of claim 1, which contains 0.01-10% by weight of the stabiliser mixture of a) and b).

15. A process for stabilising elastomers, which comprises incorporating therein or applying thereto a combination of phenols of formulae I and II as defined in claim 1.

16. A composition of claim 1 wherein $R_3$ is n-octyl or n-dodecyl.

* * * * *